United States Patent [19]

Calhoun

[11] Patent Number: 4,517,777

[45] Date of Patent: May 21, 1985

[54] TRENCHDUCT SIDE MEMBER EXTRUSION ADAPTED FOR MULTIPLE POSITIONING OF COVER PLATE

[75] Inventor: L. Owen Calhoun, Burlington, Canada

[73] Assignee: W. C. Pursley Limited, Mississauga, Canada

[21] Appl. No.: 473,101

[22] Filed: Mar. 7, 1983

[51] Int. Cl.³ ............................................. E04F 17/00
[52] U.S. Cl. .................................... 52/126.2; 52/220; 174/49; 138/111
[58] Field of Search ...................... 52/126.2, 220, 221; 174/48, 49; 138/111, 173

[56] References Cited

U.S. PATENT DOCUMENTS

| 3,453,791 | 7/1969 | Fork | 52/221 |
|---|---|---|---|
| 3,494,084 | 2/1970 | Hazen | 52/221 |
| 3,494,381 | 2/1970 | Fork . | |
| 3,593,472 | 7/1971 | Bargar et al. | 52/122 |
| 3,721,051 | 3/1973 | Fork | 52/173 |
| 3,848,379 | 11/1974 | Hazen | 52/221 |
| 3,851,674 | 12/1974 | Fork | 138/173 |
| 3,886,702 | 6/1975 | Fork | 52/221 |
| 3,903,666 | 9/1975 | Fork | 52/221 |
| 4,040,755 | 8/1977 | Jorgensen | 52/221 |
| 4,065,896 | 1/1978 | Penczak | 52/220 |
| 4,404,779 | 9/1983 | Calhoun | 52/126.2 |

FOREIGN PATENT DOCUMENTS

| 939280 | 1/1974 | Canada . | |
| 939281 | 1/1974 | Canada . | |
| 2310187 | 9/1974 | Fed. Rep. of Germany | 52/220 |

Primary Examiner—Henry E. Raduazo
Attorney, Agent, or Firm—Rodger H. Flagg

[57] ABSTRACT

A trenchduct (10) having an adjustable lid-supporting means (30, 40), the trenchduct (10) having either a bottom (14) or bottomless. The construction consists of metal side walls (12) each having an outward extending flange (18), adjuster bolts (22) mounted vertically upon the horizontally extending flanges (18), and galvanized steel Z-bar side members (30) having threaded openings (37) receiving the adjuster bolts (22) to support the Z-bar side members (30) in abutting relationship with vertical members (16) of the side walls (12). Aluminum side member extrusions (40) having diagonally opposed longitudinally extending slots (42, 43) are positioned upon and secured to the inwardly projecting flanges (34) of the Z-bar side members (30). The side member extrusions (40) have an interior projection (41) for receiving resilient spring clips (100) attached to a cover plate (70) and cover plate hold down screws (60) are received in a longitudinally extending slot (42), so that a cover plate (70) may be secured at any position along the side member extrusions (40).

8 Claims, 5 Drawing Figures

TRENCHDUCT SIDE MEMBER EXTRUSION ADAPTED FOR MULTIPLE POSITIONING OF COVER PLATE

DESCRIPTION

1. Technical Field

The trenchduct relates to constructions located at subfloor level to provide distribution for electrical networks, thereby providing underfloor electric wires, cables, and telecommunication connections accessible at convenient locations.

2. Background Art

The use of trenchduct designs has gained considerable popularity because of the easy provision of electrical power connections, cables, and telecommunication wiring at predetermined locations in the subfloor for subsequent connection to related equipment as needed. Many different designs for trenchducts have been utilized, each particular design containing its own advantages and disadvantages according to the applications of the particular construction. The prior art contains numerous examples of trenchduct constructions utilizing an aluminum extrusion supported upon a metal side wall. Because of the extensive use of cast aluminum or drawn aluminum for these constructions, the inherent cost of the trenchduct has escalated remarkably, along with the added cost of construction because of the variety of components which must be attached to the extrusion.

Because of increasing material costs for such extrusion constructions, there is needed a low cost, inexpensive trenchduct construction having very few parts, a low cost of assembly, not subject to damage during shipment, and with improved strength.

Hoseason et al. U.S. Pat. No. 3,435,568 entitled "Trenchduct Assembly with Adjustable Lid-Supporting Members", issued Apr. 1, 1969 and the corresponding Canadian Pat. No. 798,597 issued Nov. 12, 1968, the Canadian patent being owned by the same assignee as herein, and Jorgensen et al. U.S. Pat. No. 4,040,755 entitled "Trench Duct Connector" issued Aug. 9, 1977 illustrate typical side wall aluminum extrusions that project inwardly from the outer periphery of the trenchduct and have an interior side wall parallel with the interior surface of the metal side wall, and thereby reducing the available space within the trenchduct for electrical sevice lines. In addition to the side wall material cost, these aluminum constructions require considerable manufacturing and assembly time to complete fabrication. Thus, an all-galvanized steel construction was developed and is described in co-pending application Ser. No. 254,880 filed Apr. 16, 1981, entitled "Trenchduct Construction Having Adjustable Lid-Supporting Means," assigned to the same assignee and incorporated by reference herein. The galvanized steel trenchduct construction described in co-pending application Ser. No. 254,880 is an inexpensive trenchduct construction having improved strength, and which fulfills the need for a low cost trenchduct construction. However, that trenchduct construction provides individual holes drilled along the top of the lid-supporting means to receive cover plate screws which secure the cover plate to the top portion of the lid-supporting means. In order to replace a cover plate that has been removed, the cover plate screws must be matched exactly with the holes drilled in the lid-supporting means in order to resecure the cover plate. This adds greatly to the construction time and costs necessary for assembly of the trenchduct construction. Thus, there is needed an improved trenchduct construction which provides the advantages of both types of trenchduct constructions, the aluminum construction and the galvanized steel construction.

DISCLOSURE OF THE INVENTION

The present invention relates to a trenchduct construction having an adjustable lid-supporting means, the trenchduct having either a bottom or bottomless. The construction consists of galvanized steel side walls, each having an outward extending flange. Adjuster bolts are mounted vertically upon the horizontally extending flanges, such that the bolts are free to rotate. Galvanized steel Z-bar side members each having spurted and threaded holes spaced along a transverse portion extending away from the side wall of the trenchduct, are positioned so that the vertical portion of each Z-bar side member slidingly engages the respective metal side wall. The stems of the adjuster bolts are received within the threaded holes in the transverse portions. Mounted upon an inwardly projecting portion of each Z-bar side member, is an aluminum side member extrusion having diagonally opposed longitudinally extending slots. The inwardly extending portion of a Z-bar side member has a plurality of openings located therein so that a side member extrusion may be secured thereto by screws extending through the openings and received in the lower slot. Each side member extrusion has an interior extension for receiving a resilient spring clip attached to the interior surface of a cover plate, and the longitudinally extending slot disposed in the upper surface of the extrusion is suitable for receiving cover plate hold down screws. A longitudinally extending slot is located in the upper most portion of each extrusion so that trim members may be inserted therein for positioning tile and carpeting relative to the extrusion. The Z-bar side members with side member extrusions secured thereto are positioned longitudinally in end-to-end abutting relationship and the extrusions are secured together by means of a clamp received on an exterior dove tail extension of each side member extrusion.

The combination extrusion member and Z-bar side member construction provides the advantageous features of both the all-aluminum extrusion and all-galvanized steel trenchduct constructions. The aluminum side member extrusions with longitudinally extending slots enables the cover plates to be attached, removed, and reattached at any position along the extrusions because the cover plate hold down screws are accepted anywhere along the slot. This improves construction and assembly time since the cover plate hold down screws do not have to be mated with threaded holes positioned to accept the screws. Additionally, the cover plates can be secured by either hold down screws or by resilient spring clips attached to the interior of the cover plate, or by both methods of securement. Construction and assembly time have been reduced because the lower continuous longitudinal slot of an extrusion receives securement screws that secure the side member extrusion to the inwardly projecting portion of the Z-bar side member. The combinaton side member extrusion and Z-bar side member construction of the present invention effects cost savings over the all-aluminum extrusion constructions, while yet retaining some of the advantages of that type of construction. Thus, the advantages of both the all-aluminum and all-galvanized steel constructions are contained within the construction of the present invention.

BEST MODE FOR CARRYING OUT THE INVENTION

Figure 1:
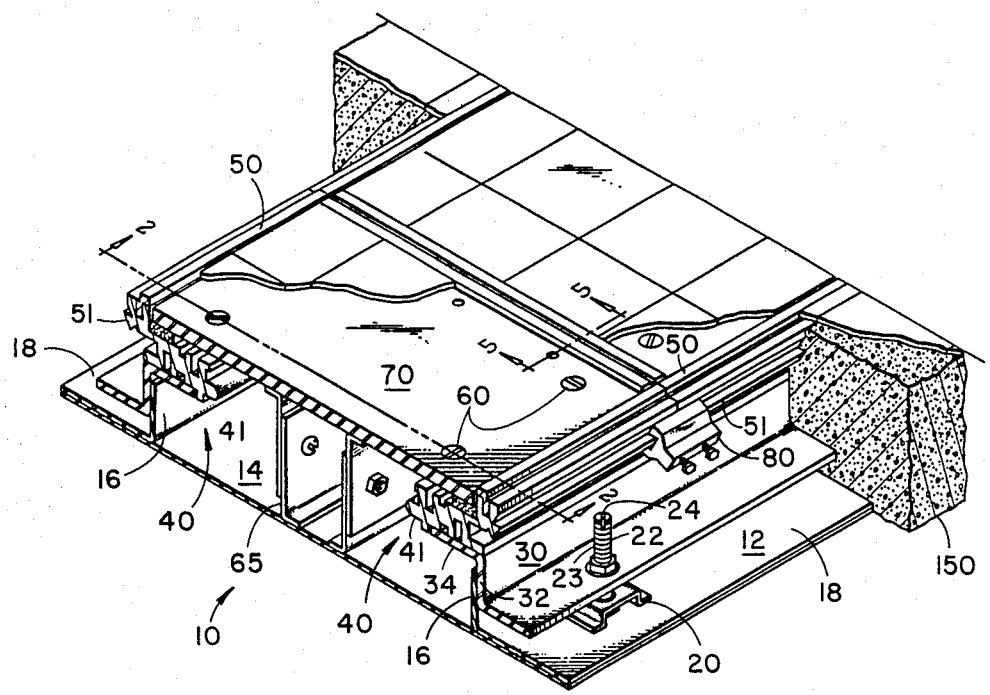
FIG. 1 is an isometric view, partially broken away, of the trenchduct construction of the present invention.
Figure 2:
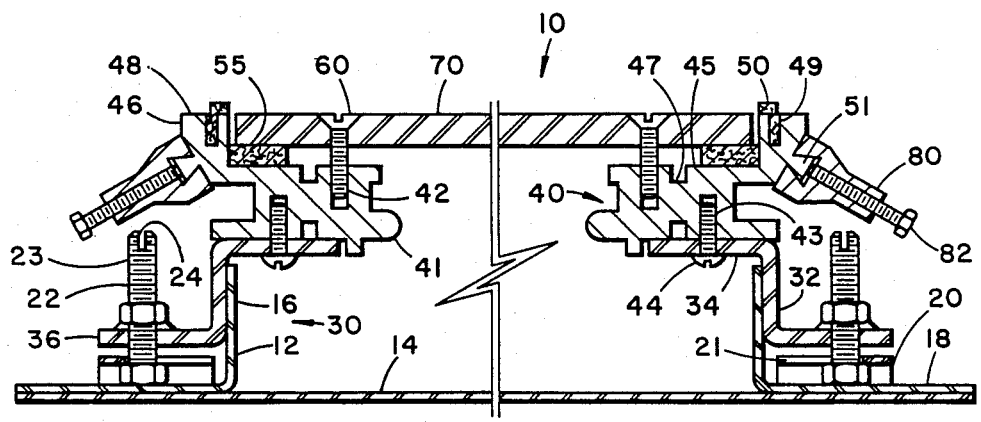
FIG. 2 is a section view along lines 2—2 of FIG. 1, and partially broken away.

Referring now to the drawings, FIGS. 1 and 2 illustrate a trenchduct 10 constructed in accordance with the present invention. The trenchduct 10 comprises galvanized steel side walls 12 each secured to a galvanized steel base 14. It should be understood that the present invention may be utilized with a trenchduct construction having either a bottom or bottomless. The construction illustrated in FIGS. 1 and 2 has a bottom i.e., base 14, however the base 14 can be eliminated to provide a bottomless trenchduct construction (see FIGS. 3 and 4). The side walls 12 comprise a vertical member 16 and a outwardly extending flange 18. Outwardly extending flanges 18 have mounted thereon a plurality of base clips 20 which secure a plurality of adjuster bolts 22 to the flanges 18. The head of each adjuster bolt 22 is trapped between the clip 20 and flange 18, with the stem 23 extending through clip slot 21, so that bolt 22 may rotate freely about its vertical axis. At one end of each rotatable bolt 22 is tool adjustment slot 24.

Z-bar side members designated generally by reference numeral 30 are comprised of galvanized steel members having to a vertical section 32, inwardly extending flanger 34, and transverse flange 36. The Z-bar side members are constructed of galvanized steel which costs substantially less to manufacture and fabricate, and is not subject to the affects of corrosion caused by the alkaline content of concrete poured exteriorly of the trenchduct 10. Located at spaced locations along each transverse flange 36 are threaded openings 37 which receive the threaded bolts 22 therein. Thus, threaded bolts 22 may be rotated by means of a tool such as a screwdriver, to effect vertical adjustment of the Z-bar side members 30. The vertical section 32 of each Z-bar side member slidingly engages the rspective vertical wall 16 to provide a vertically adjustable side wall construction.

Located upon and secured to the inwardly extending flange 34 of each Z-bar side member 30, is a side member aluminum extrusion designated generally by reference numeral 40 comprised of an all-aluminum extrusion formed for ready mounting on flange 34. The aluminum side member extrusion 40 contains diagonally opposed longitudinally extending slots 42, 43 running the entire length of the extrusion. Longitudinally extending slot 43 accepts securement screws 44 extending through respective spaced apart opening located in inwardly extending flange 34. Thus, the extrusion 40 is readily secured to the inwardly extending flange 34, which greatly reduces the assembly and fabrication costs of the two components.

Each side member extrusion 40 has an upper surface 45 upon which is disposed a gasket 55. A plurality of cover plates 70 may be located along the open end of the trenchduct 10, such that the perimeters of the cover plates are disposed upon the gasket 55. A cover plate 70 may be secured to the side member extrusion 40 by means of cover plate hold down screws 60 received in openings 72 and longitudinally extending slot 42. Upper surface 45 also contains a longitudinally extending slot 47 which not only reduces the amount of material necessary for forming the extrusion, but provides a moisture trap to capture any fluid seeping downwardly around the edges of a cover plate 70.

Side member extrusions 40 extend outwardly and upwardly to form shoulders 46 providing upper most surfaces 48. Longitudinally extending slot 49 extends along the length of each surface 48, and provides an opening for receiving trim strips therein, such as the stepped trim strip 50 shown in FIGS. 1, 2 and 5. Outwardly extending dove tail portions 51 enable extrusion members 40 positioned in end-to-end abutting relationship, to be secured together by means of clamp 80. Clamp 80 has screw member 82 which advances inwardly to engage and hold together the abutting extrusions.

Located interiorly of the trenchduct construction 10 are interior projectons 41 which provide an alternative method of attaching cover plates 70, as will hereinafter be explained.

Located within the interior of the trenchduct (10) and secured to the base 14, is barrier member 65 (FIG. 1) which effectively isolates power cables, telecommunicatons wiring, and telephone lines from one another. This is an optional feature and is installed at the factory during fabrication.

Figure 3:
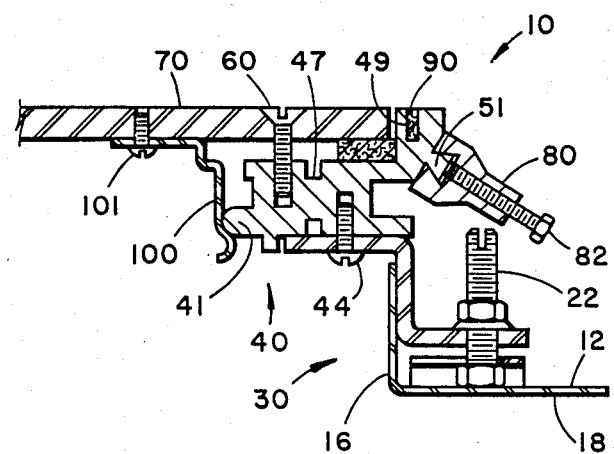
FIG. 3 is a section view of a bottomless trenchduct construction in accordance with the present invention and having a spring clip cover plate fastener and a fiber fill trim strip.

FIG. 3 illustrates a bottomless trenchduct and an alternative means for securing cover plates 70 to the side member extrusions 40. In a bottomless trenchduct construction, the flangs 18 of side walls 12 are placed upon a cellular subfloor or directly upon a concrete floor. Resilient spring clips 100 are secured, at spaced apart locations, to the bottom surface of a cover plate by means of screws 101. Resilient spring clip 100 extends downwardly to provide an interference fit with interior projecton 41 of the respective extrusion 40. Thus, a cover plate 70 may be secured to the side member extrusions through the use of either cover plate hold down screws 60, resilient spring clips 100, or a combination of both securement methods.

FIG. 3 also illustrates a fiber fill strip 90 disposed within the longitudinal extending slot 49. The fiber fill trip strip comprises an oil impregnated strip placed in slot 49 prior to shipping of contruction 10. Strip 90 prevents concrete from entering slot 49 so that concrete will not fill or obstruct the slot. After the concrete pour is completed, the stirp 90 is removed and replaced by a strip 50 when the flooring is put down.

The trenchduct construction 10 is comprised of integral Z-bar side member 30 made of glavanized steel and aluminum extrusion side members 40 secured to the respective Z-bar side members. This construction has the advantages of both types of constructions, i.e. a lower cost as compared to the all-aluminum extrusions utilized in prior art constructions, requiring less assembly time and parts, while retaining the multifaceted advantages of an all-aluminum extrusion trenchduct construction. The cover plates may be attached by different means of securement and once removed, may be readily reattached in any one of a multiplicity of positions because the cover plate hold down screws and resilient spring clips are received anywhere along the length of the side member extrusions 40. Additionally, longitudinally extending slot 43 extending along the undersurface of a side member extrusion 40 enables the ready and easy securement of an extrusion to a Z-bar side member by screws 44 threadedly received in the slot. Thus, trenchduct construction 10 retains the advantages of each type of construction and represents a substantial improvement over both prior constructions.

Figure 4:
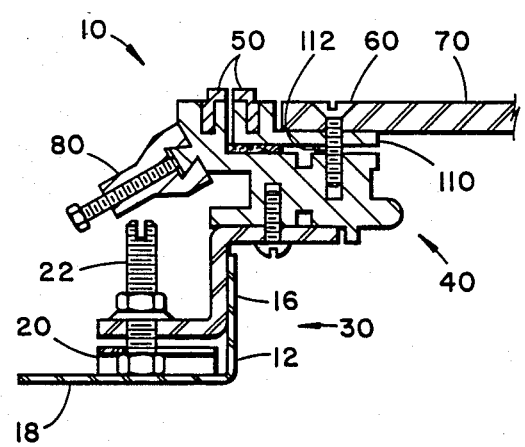
FIG. 4 is a section view of a bottomless trenchduct construction in accordance with the present invention and having a header attached to the cover plate and double stepped trim strips; and, FIG. 5 is a section view along lines 5—5 of FIG. 1, and illustrating the cover plate dust stop, double header and double trim strips.

Referring to FIG. 4, there is illustrated an alternative embodiment wherein cover plate 70 has vinyl trim header 110 disposed about the perimeter of the plate and secured to the underside of cover plate 70 by secrews 112. Cover plate 70 is secured to side member extrusion 40 in the same manner as described above; however, a slightly smaller dimensioned cover plate 70 with vinyl trim header 110 attached thereto enables the utilization of two trim pieces, such as aluminum stepped trim members 50 illustrated in FIG. 4. It should be understood that the two trim strip members could have other shapes.

Figure 5:
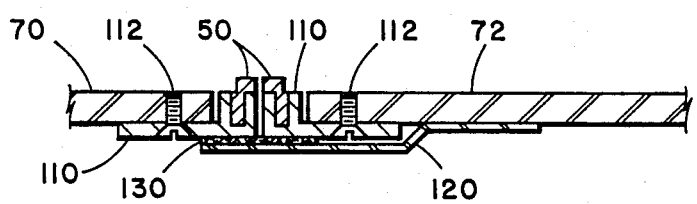

FIG. 5 is a section view along view line 5—5 of FIG. 1, wherein the cover plate dust stop is shown in detail. Cover plate 72 has galvanized steel dust stops 120 welded to the underside of two ends, and is positioned next to another cover plate 70. The dust stop extends outwardly from the end 71 of cover plate 72, and positioned on stop 120 is a gasket 130. Also attached to the underside of the cover plates, are vinyl trim headers 110 secured by means of screws 112. Dust stop 120 provides support for and positions gasket 130 which, with headers 110, prevents dust and other debris from entering into the interior of the trenchduct construction 10. It should be understood that dust stop 120 extends outwardly to prevent dust from entering through the small opening located between cover plates disposed end-to-end upon the trenchduct construction 10.

OPERATION

In the preliminary stages of construction, the trenchduct 10 is suitably located in accordance with an electrical distribution network. The distribution network takes into account the placement and routing of communication cables, wiring, and service outlets which are required and intended to be accessible after installation but effectively concealed at the subfloor level. The duct work consists of a base 14 and side walls 12 which make a "run," or may have the base 14 eliminated for a bottomless trenchduct construction wherein the side walls 12 are disposed upon a cellular subsurface construction. Z-bar side members 30, having the side member extrusions 40 and cover plates 70 mounted and secured thereon, are mounted upon bolts 22 by threading bolts 22 in the threaded openings 37 in transverse flanges 36, this subassembly having been accomplished prior to shipping. After the cover plates 70, side member extrusions 40, and Z-bar side members 30 subassemblies have been placed upon the side walls 12, clips 20 are positioned about bolts 22 by sliding each clip slot 21 around a bolt stem 23, and the flanges of the clips welded to flange 18. The adjuster bolts 22 are rotated to adjust the height of the side members 30 and extrusions 40 to the proper level prior to a concrete pour (see FIG. 1). The vertical section 32 of each Z-bar side member 30 slideably engages its associated wall 16 so that the height of the side walls of trenchduct 10 may be vertically adjusted according to specification. After vertical adjustment of the cover plates 70, as described above, concrete 150 (FIG. 1) is poured around the external surface of the trenchduct 10 which becomes a permanent installation in the subfloor of the building contruction. The cover plates are removed and the trenchduct construction is enabled to receive installation of the communication cables, wiring, and power connections in addition to any such connections placed in the trenchduct prior to the concrete pour. Cover plates 70 are then reattached at any position along the side member extrusions 40. Trim stips 90 are removed and trim strips 50, or other configurations, are installed with the flooring placed upon the concrete subfloor.

For future use, cover plates 70 may be removed by backing off the cover plate hold down screws 60, and access be had to the power cables, telecommunications, electrical wiring and so forth contained within trenchduct 10. Plates 70 may be readily reattached to the trenchduct 10 at any position along the length of the trenchduct 10 because hold down screws 60 are received at any location along the length of the longitudinally extending slot 42. Of course, cover plates 70 may also be secured to side member extrusions 40 by means of resilient spring clip members 100 which provide an interference fit with interior projections 41.

INDUSTRIAL APPLICABILITY

The invention is especially adapted for commercial construction and distribution of electric power, service, and communication lines in accordance with a preplanned service network.

CONCLUSION

Although the present invention has been illustrated and described in connection with example embodiments, it will be understood that these are illustrative of the invention, and by no means restrictive thereof. It is reasonably to be expected that those skilled in the art can make numerous revisions and additions to the invention and it is intended that such revisions and additions will be included within the scope of the following claims as equivalents of the invention.

I claim:

1. In a trenchduct assembly, for internally receiving electric wires and cables, the combination comprising means forming galvanized steel side walls each with an outwardly extending flange and spaced apart to define an open space for receiving electrical service therebetween, vertically adjustable galvanized steel lid-supporting means slideably engagable with said side walls whereby said lid-supporting means are operatively defined in a lateral position relative to said side walls, said lid-supporting means including steel portions forming a Z-shaped cross section, one of said steel portions comprising a vertical section complementarily associated with a respective side wall, one portion projecting laterally above the confines of the open space formed by said side walls to receive the wire cables, and one portion comprising a traverse flange disposed outside the confines of said trenchduct and extending away from said duct and including threaded openings therein, threaded means operatively secured to the outwardly extending flanges of said side walls and threadedly received by the threaded openings in said lid-supporting means to effect vertical adjustable movement of said lid-supporting means, side rail members extending parallel to the longitudinal axis of said lid-supporting means and each operatively secured to said portion projecting laterally above the confines of said open space, each side rail member including a pair of diagonally opposed longitudinal slots for receiving securement means, one slot receiving means securing said side rail member to said portion projecting laterally above said open space and the other of said slots receiving securement means for holding down a trenchduct cover plate, an upper longitudinal slot opening exterior of said trenchduct for receiving trim means therein, and a longitudinal exterior extension receiving attachment means for securing and holding together side rail members linearly aligned in end-to-end abutting relationship, and a plurality of cover plates disposed on the open end of said trenchduct at substantially floor level and secured to said side rail members.

2. The combination in accordance with claim 1, wherein each side rail member has an interior protrusion engaging resilient securement means extending from a cover plate to hold said cover plate in engagement with said side rail member.

3. The combination in accordance with claim 1, wherein said trim means comprises a filler disposed in said slot opening and one end of the filler substantially level with the top surface of the respective side rail member.

4. The combination in accordance with claim 1, wherein said trim means comprises a stepped trim member for positioning tile relative to said cover plate and respective side rail member.

5. The combination in accordance with claim 1, further comprising a gasket received upon an interior surface of a respective side rail member, a cover plate header secured to said cover plate and having a trim slot opening therein, and stepped trim members each positioned in a respective slot opening of said side rail members and cover plate header.

6. The combination in accordance with claim 1, further comprising cover plate flange means extending from two opposite ends of a cover plate and having gasket means disposed thereon and disposed beneath the underside of said plate and an adjoining cover plate, cover plate headers each secured to one of said plates and abutting the end of the plate, whereby loose matter is prevented from entering the open space of said trenchduct.

7. The combination in accordance with claim 1, including clip means secured to said outwardly extending flanges, rotatable heads of said threaded means received by said clip means and permitting rotation of said threaded means, threaded stems of said threaded means received by respective threaded openings in said lid-supporting means, and a slot at the upper end of a respective threaded stem to facilitate tool-operated rotation of said stem whereby said lid-supporting means can be vertically adjusted before pouring concrete about the outer walls of said trenchduct construction.

8. The combination in accordance with claim 1, wherein said side rail members include receptacle means for capturing moisture therein.

* * * * *